United States Patent
Fabre et al.

(10) Patent No.: US 11,364,659 B2
(45) Date of Patent: Jun. 21, 2022

(54) INSTALLATION AND METHOD FOR FORMING A REVOLVING FIBROUS PREFORM EXHIBITING, IN RADIAL SECTION, A PROFILE THAT EVOLVES

(71) Applicant: SAFRAN AIRCRAFT ENGINES, Paris (FR)

(72) Inventors: Hubert Jean Marie Fabre, Moissy-Cramayel (FR); Jérémy Hellot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 670 days.

(21) Appl. No.: 16/331,316

(22) PCT Filed: Sep. 4, 2017

(86) PCT No.: PCT/FR2017/052333
§ 371 (c)(1),
(2) Date: Mar. 7, 2019

(87) PCT Pub. No.: WO2018/046826
PCT Pub. Date: Mar. 15, 2018

(65) Prior Publication Data
US 2019/0263021 A1    Aug. 29, 2019

(30) Foreign Application Priority Data
Sep. 7, 2016    (FR) ...................................... 1658307

(51) Int. Cl.
*B29C 53/56* (2006.01)
*B29B 11/16* (2006.01)
(Continued)

(52) U.S. Cl.
CPC ............ *B29B 11/16* (2013.01); *B29C 53/043* (2013.01); *B29C 53/562* (2013.01); *B29C 70/32* (2013.01);
(Continued)

(58) Field of Classification Search
CPC ........ B29C 53/8016; B29C 2053/8025; B29C 53/566; B29C 53/562; B29C 53/043; B29C 70/32; B29C 53/56
See application file for complete search history.

(56) References Cited

FOREIGN PATENT DOCUMENTS

| DE | 10 2008 028441 A1 | 12/2009 |
|----|-------------------|---------|
| EP | 1 938 955 A1 | 7/2008 |

(Continued)

OTHER PUBLICATIONS

International Search Report as issued in International Patent Application No. PCT/FR2017/052333, dated Nov. 23, 2017.

*Primary Examiner* — Matthew J Daniels
(74) *Attorney, Agent, or Firm* — Pillsbury Winthrop Shaw Pittman LLP (57) ABSTRACT

An installation for forming a fiber preform, includes a follower roller. The follower roller presents a profile in section that has at least a first slope forming an angle with the axis of the follower roller and a second slope forming a second angle with the axis of the follower roller that is different from the first angle. The installation also has at least one backing roller presenting a shape complementary to the first and second slopes, the installation including a holder for holding each backing roller and configured to hold the backing roller at a predetermined distance from the first and second slopes or configured to apply contact pressure from the backing roller against the first and second slopes.

4 Claims, 4 Drawing Sheets

(51) Int. Cl.
    *B29C 70/32*     (2006.01)
    *B29C 53/04*     (2006.01)
    *B29C 53/80*     (2006.01)
    *B29L 31/00*     (2006.01)

(52) U.S. Cl.
    CPC ............ *B29C 2053/8025* (2013.01); *B29L 2031/7504* (2013.01)

(56) References Cited

FOREIGN PATENT DOCUMENTS

| | | |
|---|---|---|
| EP | 2 979 852 A1 | 2/2016 |
| RU | 1796475 A1 | 2/1993 |
| RU | 2505404 C2 | 1/2014 |
| RU | 2587172 C2 | 6/2016 |
| WO | WO 2006/136755 A2 | 12/2006 |
| WO | WO 2009/062749 A1 | 5/2009 |

INSTALLATION AND METHOD FOR FORMING A REVOLVING FIBROUS PREFORM EXHIBITING, IN RADIAL SECTION, A PROFILE THAT EVOLVES

CROSS REFERENCE TO RELATED APPLICATIONS

This application is the U.S. National Stage of PCT/FR2017/052333, filed Sep. 4, 2017, which in turn claims priority to French Patent Application No. 1658307 filed Sep. 7, 2016, the entire contents of all applications are incorporated herein by reference in their entireties.

BACKGROUND OF THE INVENTION

The present invention relates to shaping fiber preforms of fiber reinforcing structures for composite material parts by winding a fiber texture obtained by three-dimensional (3D) or multilayer weaving.

The invention relates more particularly to fiber preforms that are to form reinforcement for axisymmetric composite material parts that present a profile in radial section that varies (varying in shape or thickness), such as for example a fan casing for an aeroengine. The fiber preform for such a part is made by weaving a fiber texture and by winding the texture under tension onto an axisymmetric mold including a winding surface of radial section that presents a profile in relief corresponding to the profile of the part that is to be fabricated.

In order to make a fiber texture that is appropriate for the varying shape of the injection mold, use is made of shape weaving, or "contour" weaving, or "outline" weaving, which consists in taking up different lengths of warp yarns as a function of the positions of those yarns across the width of the fiber texture being woven in the form of a strip so as to obtain ratios between the lengths of warp yarn (tangential direction) that are similar to the ratios between the radii defining the varying profile of the final part that is to be fabricated.

The fiber texture as woven in this way is stored on a storage mandrel so as to be subsequently wound under tension onto an axisymmetric injection mold having a winding surface with a profile in relief in radial section that corresponds to the profile of the part that is to be fabricated. While it is being wound onto the mold, the texture is tensioned by the storage mandrel, also referred to as the "takeup" mandrel, with one or more follower rollers being placed between the storage mandrel and the injection mold.

Across their axial width, the follower roller(s) present(s) varying radius defining an outside surface with a profile in relief that serves to conserve the yarn-length ratios as defined during weaving between the storage mandrel and the injection mold. Consequently, the follower rollers present on their surfaces that are to come into contact with the fiber texture one or more slopes at an angle with the axis of the roller. When the fiber texture passes under tension over a sloping portion of a follower roller, the texture might form creases, in particular because of the presence of deviations in the weaving, of deformation in the texture under tension, and/or of the texture sliding over the slope. These creases can propagate in the texture as far as the mold. When a crease appears, in particular in the mold, it is necessary to unwind the portion of the texture in question and then to pull it manually so as to make it flat again, and finally restart winding. Shaping the texture by winding then becomes time consuming, and requires the presence and the action of a specialized operator. Taking out creases during winding also leads to interruption in the tensioning of the texture so as to enable it to be handled, and that is not desirable in terms of fabrication specifications.

OBJECT AND SUMMARY OF THE INVENTION

It is therefore desirable to be able to make 3D or multi-layer fiber preforms while significantly reducing any risk of creases appearing in the fiber texture while it is being shaped by being wound.

To this end, the invention provides an installation forming an axisymmetric fiber preform presenting a profile that varies in radial section, the installation comprising a storage mandrel for storing a fiber texture in the form of a wound strip, one or more follower rollers, and an axisymmetric mold onto which the fiber texture is to be shaped by winding, at least one follower roller presenting, in section on a plane defined by an axial direction and by a radial direction, a profile including at least a first slope forming an angle with the axis of the follower roller, and a portion adjacent to the first slope, said portion being parallel to the shaft of the follower roller or corresponding to a second slope forming a second angle with the axis of the follower roller that is different from the first angle, the installation being characterized in that it further comprises at least one backing roller of shape complementary to the first slope and the adjacent portion of said first slope, the installation including holder means for said at least one backing roller configured to hold said backing roller at a predetermined distance from the first slope and the portion adjacent to said first slope or configured to apply contact pressure from the backing roller against the first slope and the portion adjacent to said first slope.

Thus, when the backing roller is held at a predetermined distance from the follower roller corresponding to the thickness of the fiber texture, it constitutes a physical obstacle to creases forming in the fiber texture as it passes over the follower roller. Specifically, under such circumstances, the backing roller leaves no space available for creases to develop in the fiber texture.

Likewise, when the backing roller is held away from the follower roller at a predetermined distance that is less than the thickness of the fiber texture, or when the backing roller applies contact pressure against the follower roller, the backing roller applies contact pressure on the fiber texture interposed between the follower roller and the backing roller, thereby preventing creases forming in the texture as it passes over the follower roller. This increases friction between the texture and the follower roller, thus making it possible to avoid creases forming in the texture, in particular by slipping on the slope(s) of the follower roller.

According to a first particular characteristic of the installation of the invention, each backing roller has a rough surface. This makes it possible to further increase friction with the texture as it passes over the follower roller.

According to a second particular characteristic of the installation of the invention, at least one backing roller presents on its surface at least one portion in relief corresponding to a change in section of the backing roller. It is thus possible to adapt the backing roller to any change(s) of thickness that might be present in the fiber texture.

According to a third particular characteristic of the installation of the invention, at least one backing roller comprises at least two rollers, the installation including holder mans for holding the rollers that are configured to hold said rollers at predetermined distances respectively from the first slope and from the portion adjacent to said first slope, or holder means for holding said rollers that are configured to apply contact pressure from the rollers respectively against the first slope and the portion adjacent to said first slope.

Under such circumstances, the backing roller may comprise at least three rollers, two of which are held in parallel and offset from each other in a direction perpendicular to the direction of the axes of the rollers. It is thus possible to adapt the backing roller to any change(s) of thickness that might be present in the fiber texture.

The invention also provides a method of shaping an axisymmetric fiber preform presenting a varying profile in radial section from a fiber texture obtained by three-dimensional or multilayer weaving between a plurality of layers of warp yarns interlinked by weft yarns, the fiber texture being shaped by being wound under tension onto an axisymmetric mold, the fiber texture being unwound from a storage mandrel, the fiber texture traveling over one or more follower rollers placed between the storage mandrel and the axisymmetric mold, at least one follower roller presenting, in section in a plane defined by an axial direction and a radial direction, a profile including at least a first slope forming an angle with the axis of the follower roller and a portion adjacent to the first slope, said portion being parallel to the axis of the follower roller or corresponding to a second slope forming a second angle with the axis of the follower roller that is different from the first angle; and the method being characterized in that it further comprises using at least one backing roller presenting a shape complementary to the first slope and the portion adjacent to said first slope, each backing roller being held at a predetermined distance from the first slope and from the portion adjacent to said first slope, the predetermined distance being less than or equal to the thickness of the fiber texture, or each backing roller applying contact pressure against the fiber texture on the first slope and the portion adjacent to said first slope.

According to a first particular characteristic of the method of the invention, each backing roller has a rough surface.

According to a second characteristic of the method of the invention, the fiber texture presents at least one change in thickness in its width direction and wherein at least one backing roller presents on its surface at least one portion in relief for co-operating with said at least one change in thickness.

According to a third particular characteristic of the method of the invention, at least one backing roller has at least two rollers, the rollers being held at respective predetermined distances from the first slope and the portion adjacent to said first slope, the predetermined distances being less than or equal to the thickness of the fiber texture, or said rollers apply pressure against the fiber texture respectively at the first slope and at the portion adjacent to said first slope.

According to a fourth particular characteristic of the method of the invention, the fiber texture presents at least one change in thickness in its width direction, and the backing roller has at least three rollers, with two of them being held in parallel and offset relative to each other in a direction perpendicular to the direction of the axes of the rollers so as to co-operate with said at least one change in thickness.

BRIEF DESCRIPTION OF THE DRAWINGS

Other characteristics and advantages of the invention appear from the following description of particular embodiments of the invention given as non-limiting examples, with reference to the accompanying drawings, in which.

DETAILED DESCRIPTION OF EMBODIMENTS

Figure 2:
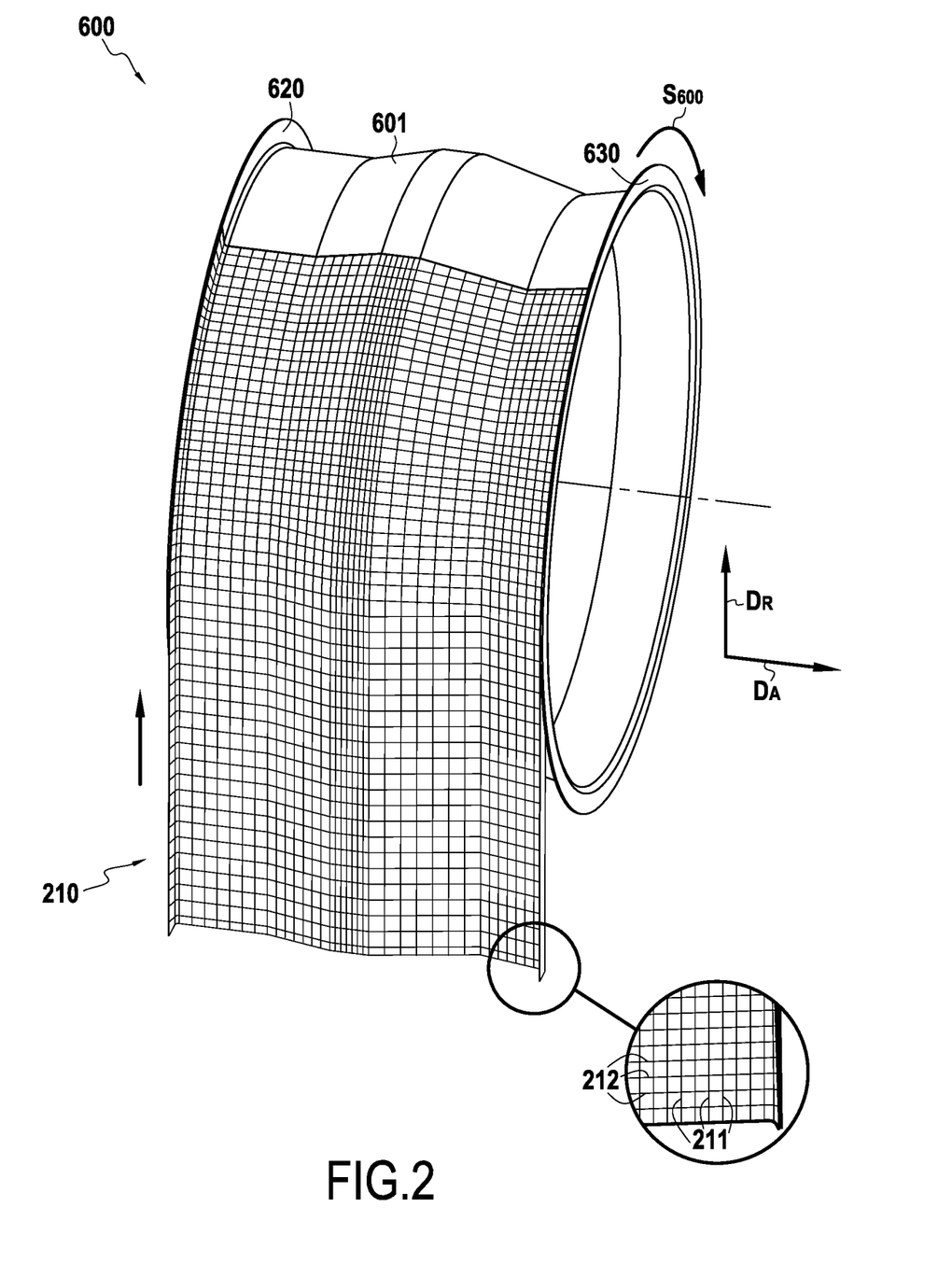
FIG. 2 is a diagrammatic perspective view showing a fiber texture being wound onto an injection mold of the FIG. 1 installation.

The invention applies in general manner to making axisymmetric fiber preforms presenting, in radial section, a profile that varies, and that are suitable for constituting fiber reinforcement for preforms for fabricating composite material parts of axisymmetric shape likewise presenting varying profile and/or varying thickness, in particular in radial section, where a radial section corresponds to a plane defined by the axial direction and the radial direction of the mold on which the preform is shaped, such as the axial direction $D_A$ and the radial direction $D_R$ shown in FIG. 2. The parts are obtained by winding a fiber texture onto a mold and by injecting a matrix precursor into the resulting fiber preform, the matrix typically being a resin.

Figure 1:
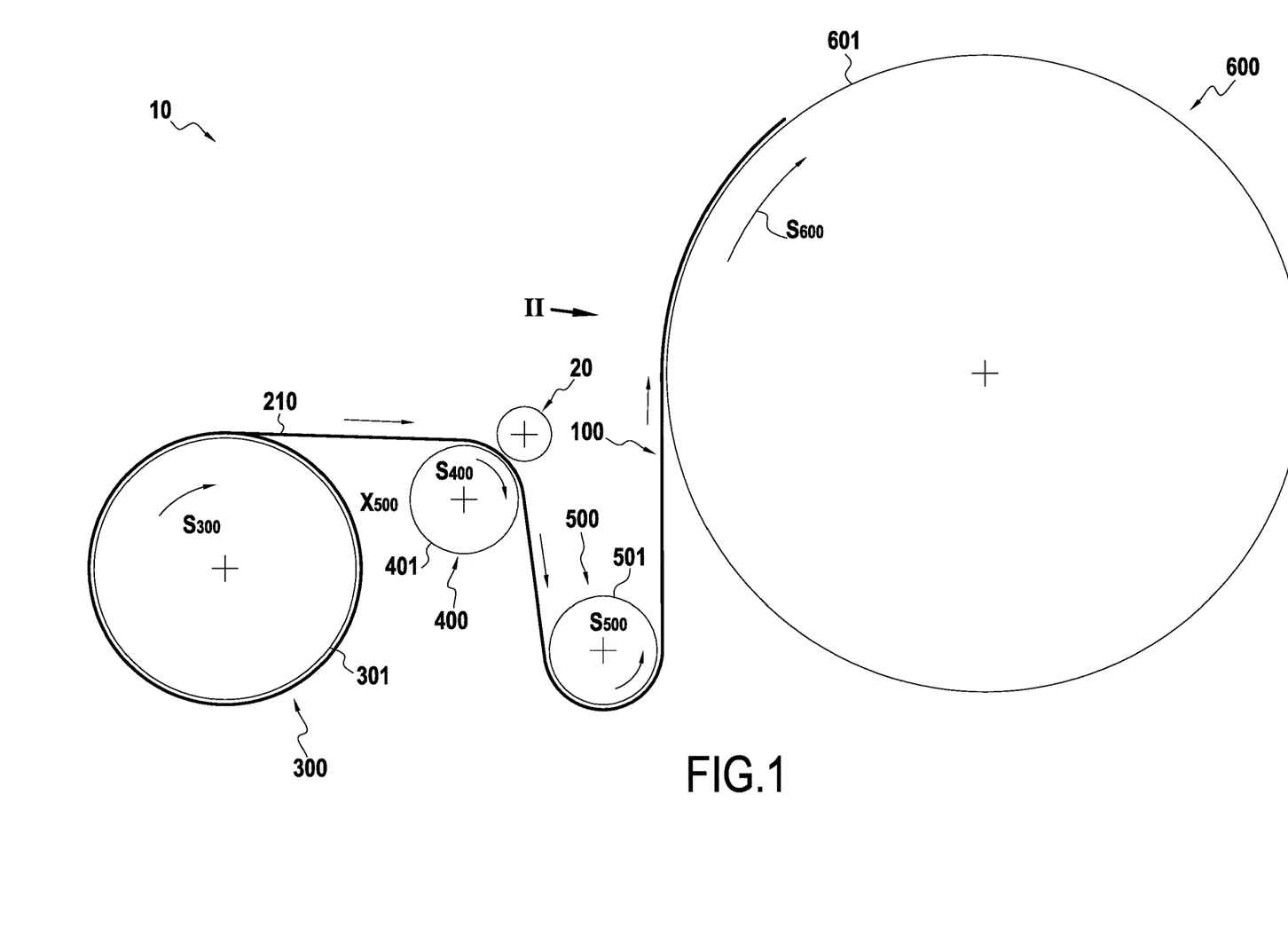
FIG. 1 is a diagrammatic view of an installation for shaping a fiber texture of varying shape in accordance with an implementation of the invention.

FIG. 1 shows an installation 10 for shaping a fiber preform of varying shape in accordance with an implementation of the invention. The installation 10 comprises a storage mandrel 300, two follower rollers 400 and 500 placed downstream from the mandrel 300 in the travel direction of the fiber texture and a mold 600 placed downstream from the follower roller 500. A fiber texture 210 present on the storage mandrel 300 is unwound therefrom in order to be shaped by being wound on the mold 600, with winding taking place under tension that is controlled at the storage mandrel.

The fiber structure 210 is obtained by three-dimensional weaving or by multilayer weaving that is performed in known manner by means of a Jacquard type loom having arranged thereon a bundle of warp yarns or strands organized in a plurality of layers, the warp yarns being interlinked by weft yarns.

The term "three-dimensional" weaving or "3D" weaving is used herein to mean weaving in which at least some of the weft yarns interlink warp yarns over a plurality of warp layers, or vice versa. 3D weaving may be of the interlock type, as described in Document WO 2006/136755.

The term "multilayer" weaving is used herein to designate 3D weaving with a plurality of warp layers, each warp layer having a base weave that is equivalent to a conventional 2D weave, such as a plain, satin, or twill type weave, but in which certain points of the weave interlink warp layers, or vice versa.

Making the fiber structure by 3D or multilayer weaving serves to obtain connection between the layers, and thus to have good mechanical strength for the fiber structure and for the resulting composite material part, and do so in a single textile operation.

The fiber structure may be woven in particular from yarns made of carbon fibers, of ceramic fibers, such as silicon carbide fibers, of glass fibers, or indeed of aramid fibers.

In order to make a fiber texture that is suitable for the varying shape of the fiber preform that is to be shaped on the injection mold, use is made of shape weaving, also known as "contour" weaving, which consists in taking up different lengths of warp yarn as a function of the width positions of the warp yarns across the fiber texture being woven in the form of a strip. For this purpose, one or more takeup rollers are used at the outlet from the loom that present varying radius across their axial width so as to define an outside surface having a profile in relief that enables different lengths of warp yarn to be taken up as a function of the positions of the warp yarns across the width of the fiber texture, a greater length of warp yarn being taken up by a portion of a takeup roller presenting a radius greater than the remainder of the roller. The differential takeup performed by takeup rollers works back into the weaving cell of the loom by pulling out the right length of warp yarn prior to inserting the following column of weft yarn. The texture as woven in this way is wound onto a storage drum or mandrel, also referred to as a "takeup" mandrel, that is situated downstream from the takeup rollers. The fiber texture is thus stored for subsequent shaping on a mold.

As shown in FIG. 2, the fiber preform is shaped by winding the fiber texture 210 made by three-dimensional weaving between a plurality of warp yarns 211 and a plurality of weft yarns 212 onto an injection mold 600, with the fiber texture forming a strip presenting a profile that varies in cross-section, i.e. that presents variation of shape and/or of thickness in cross-section. In radial section, the mold presents a profile corresponding to the profile of the part that is to be made, which, in the presently-described example, corresponds to a fan casing for an aeroengine.

To this end, the mold 600 presents an outside surface 601 of profile in relief that corresponds to the inside surface of the casing that is to be made. By being wound onto the mandrel 200, the fiber texture 210 fits closely to its profile. The mold 600 also has two cheek plates 620 and 630 for forming portions of the fiber preform that correspond to the flanges of the casing that is to be fabricated. The mold 600 is driven to rotate in the direction of rotation $S_{600}$, e.g. by an electric motor (not shown in FIG. 2), while the fiber texture 210 is tensioned between the storage mandrel 300 and the mold 600 by the follower rollers 400 and 500.

The first and second follower rollers 400 and 500 placed downstream from the storage mandrel 300 are driven to rotate in respective directions of rotation $S_{400}$ and $S_{500}$ shown in FIG. 1. Across their axial width, they present a radius that varies so as to define respective outside surfaces 401 and 501 presenting a profile in relief that corresponds to the profile intended for the fiber preform that is to be made, these profiles possessing one or more slopes over which the fiber texture is to travel.

The installation 10 also has a storage drum or mandrel 300, also referred to as a "takeup" mandrel, driven in rotation mainly in the direction of rotation $S_{300}$.

Figure 3A:
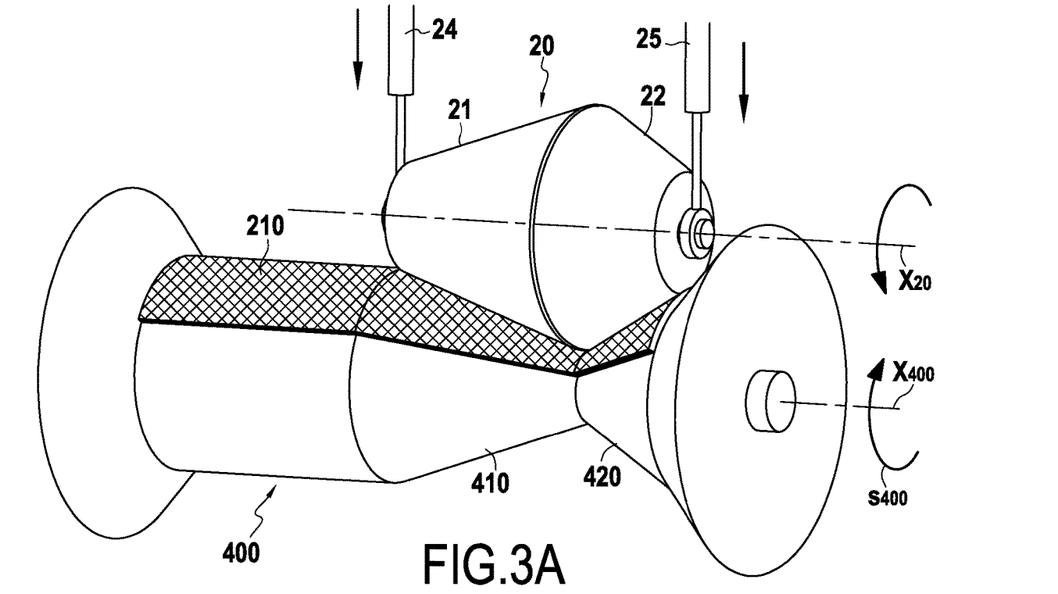
FIGS. 3A and 3B are diagrammatic views, respectively in perspective and in section showing a follower roller and a backing roller associated with the FIG. 2 installation.
Figure 3B:
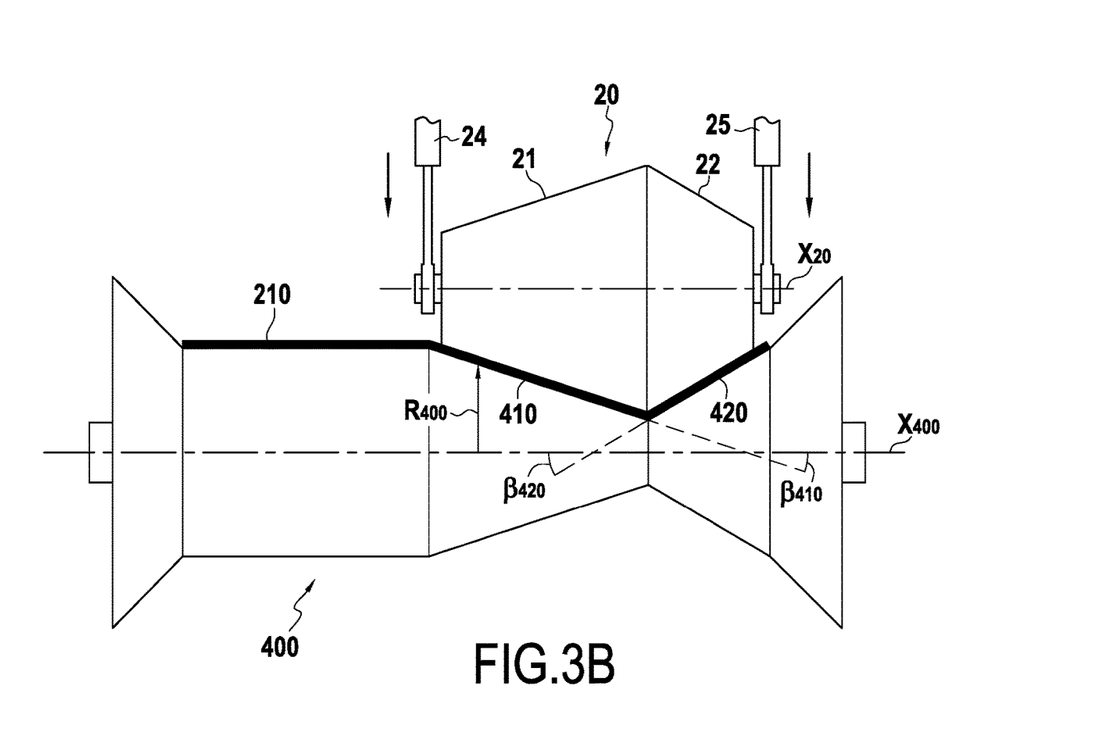

In accordance with the invention, at least one backing roller is used in association with a follower roller. In the presently-described example, and as shown in FIGS. 3A and 3B, the installation 10 also has a backing roller 20 that is used with a follower roller 400. The follower roller 400 extends axially along an axis $X_{400}$ and it presents a radius $R_{400}$ that varies along the axis $X_{400}$ (FIG. 3B) such that the follower roller 400 presents adjacent first and second slopes 410 and 420 each forming a respective angle $\beta_{410}$ and $\beta_{420}$ with the axis $X_{400}$ of the follower roller 400. The backing roller 20 is complementary in shape to the first and second slopes 410 and 420 of the follower roller 400. In the present invention, the term "complementary shape" when used of the backing roller is to mean a shape that essentially follows the facing slope or portions of the follower roller with which the backing roller is to engage, the surface of the backing roller possibly presenting one or more portions in relief serving to adapt to variations in the thickness of the fiber texture, as explained below in greater detail. In the presently-described example, the backing roller 20 presents a first slope 21 complementary to the first slope 410 of the follower roller 400, and a second slope 22 complementary to the second slope 420 of the follower roller 400.

The installation 10 has means for holding the backing roller 20, which means are configured to keep the backing roller in alignment with the first and second slopes 410 and 420 of the follower roller 400. In this example, the holder means are constituted by two actuators 24 and 25 that are connected to the shaft $X_{20}$ of the backing roller 20, being configured to hold the backing roller 20 at a predetermined distance from the first and second slopes 410 and 420, or else to apply contact pressure between the backing roller 20 and the first and second slopes 410 and 420. When the backing roller 20 is held at a predetermined distance from the slopes 410 and 420 of the follower roller 400, this distance is less than or equal to the thickness of the fiber texture 210.

Thus, when the backing roller is held away from the follower roller at a predetermined distance corresponding to the thickness of the fiber texture, the backing roller constitutes a physical obstacle to creases forming in the fiber texture as it passes over the follower roller. Specifically, under such circumstances, the backing roller does not leave any space available for creases to develop in the fiber texture.

Likewise, when the backing roller is held at a predetermined distance from the bottom follower roller equal to the thickness of the fiber texture, or when the backing roller applies contact pressure against the follower roller, the backing roller applies contact pressure against the fiber texture interposed between the follower roller and the backing roller, thereby preventing creases forming in the texture as it passes over the follower roller. This increase in friction between the texture and the follower roller, thus serving to avoid creases forming in the texture, in particular by sliding on the slope(s) of the follower roller. Friction can also be increased by providing the follower roller with a rough surface.

Figure 4:
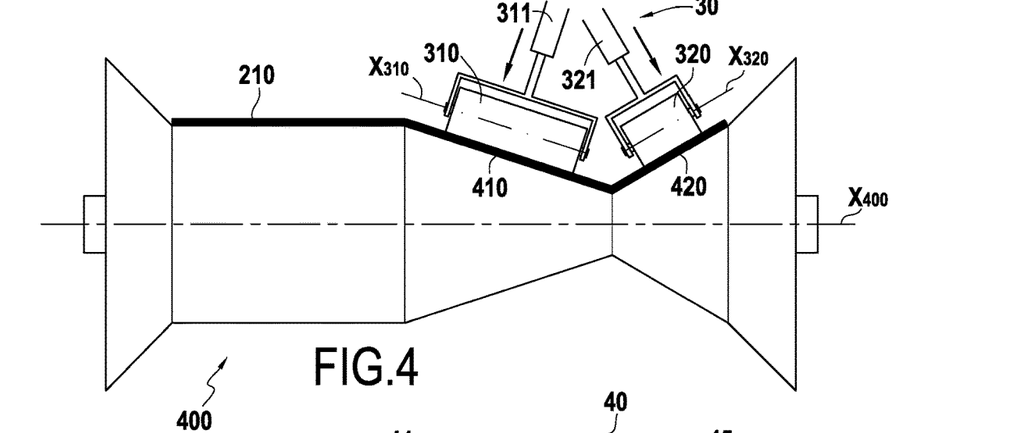
FIG. 4 is a diagrammatic section view of a follower roller of the FIG. 2 installation associated with a backing roller made up of a plurality of rollers.

FIG. 4 shows another embodiment of a backing roller in the invention, that differs from the above-described backing roller 20 in that it is made up of a plurality of rollers. More precisely, in FIG. 4, a backing roller 30 is constituted by a first roller 310 and by a second roller 320. In this embodiment, the installation for shaping a fiber preform includes specific holder means for the first and second rollers 310 and 320 of the backing roller 30, which holder means are configured to hold the first and second rollers 310 and 320 respectively in alignment with the first and second slopes 410 and 420 of the follower roller 400. The holder means, constituted in this example by a first actuator 311 connected to a shaft $X_{310}$ of the first roller 310, and a second actuator 321 connected to the shaft $X_{320}$ of the second roller 320, are configured to hold the rollers 310 and 320 at predetermined distances from the first and second slopes 410 and 420 or to apply contact pressure from the backing roller 30 against the first and second slopes 410 and 420. When the rollers 310 and 320 of the backing roller 30 are held at a predetermined distance from the slopes 410 and 420 of the follower roller 400, this distance is less than or equal to the thickness of the fiber texture 210.

Thus, when the rollers 310 and 320 of the backing roller 30 are held away from the follower roller at a predetermined distance corresponding to the thickness of the fiber texture, the rollers constitute physical obstacles to creases forming in the fiber texture as it passes over the follower roller since they do not leave any space available for creases to develop in the fiber texture. Likewise, the rollers of the backing roller are held at a predetermined distance from the bottom follower roller, which distance is less than the thickness of the fiber texture, or when the rollers of the backing roller apply contact pressure on the follower roller, the rollers of the backing roller apply contact pressure on the fiber texture, thereby preventing creases forming in the texture as it passes over the follower roller. This increases friction between the texture and the follower roller, thereby making it possible to avoid creases forming in the texture in particular by slipping on the slope(s) of the follower roller. Friction can likewise be increased by giving the rollers of the backing roller surfaces that are rough.

Figure 5:
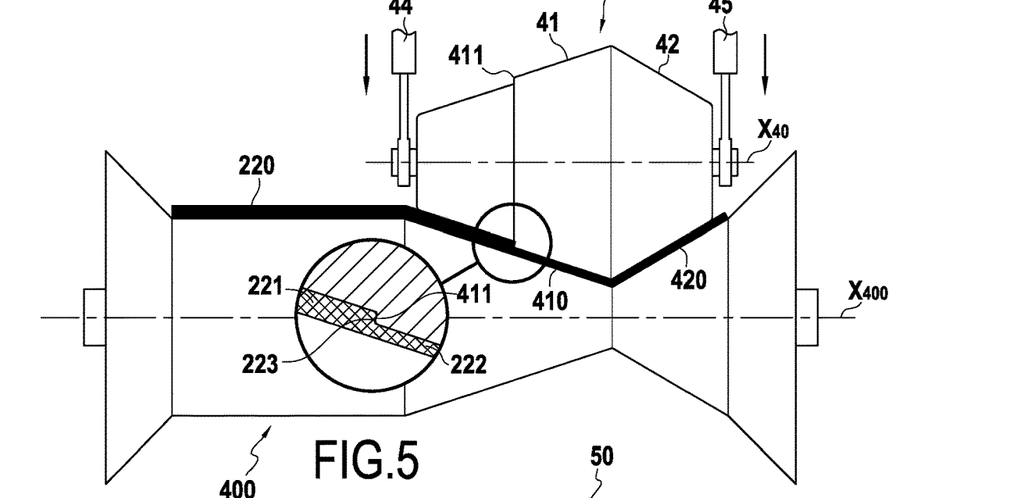
FIG. 5 is a diagrammatic section view of a follower roller of the FIG. 2 installation associated with a backing roller presenting a portion in relief in its surface.

FIG. 5 shows another embodiment of a backing roller in the invention differing from the above-described backing roller 20 in that its surface is adapted to follow variation in the thickness of the fiber texture. More precisely, in FIG. 5, the backing roller 40 presents a first slope 41 complementary to the first slope 410 of the follower roller 400, and a second slope 42 complementary to the second slope 420 of the follower roller 400. In the presently-described example, the installation for shaping a fiber preform is used with a fiber texture 220 that presents a portion of greater thickness 221 leading to a change of thickness 223 in the profile of the texture (i.e. in its width) relative to the other portion 222 of the texture. Under such circumstances, in order to adapt to such change(s) of thickness present in the fiber texture, the backing roller includes one or more portions in relief in its surface for the purpose of co-operating with the change(s) of thickness in the texture.

In the presently-described example, the change in thickness 223 may be present in the fiber texture over the first slope 41 of the backing roller 40, the slope 41 presenting a portion in relief or shoulder 411 in order to reduce the section of the backing roller 40 at the change in thickness 223, so as to adapt to the varying thickness of the fiber texture.

The installation includes holder means for holding the backing roller 40 that are configured to hold the backing roller in alignment with the first and second slopes 410 and 420 of the follower roller 400. The holder means, constituted in this example by two actuators 44 and 45 connected to the shaft $X_{40}$ of the backing roller 40 are configured to hold the backing roller 40 at a predetermined distance from the first and second slopes 410 and 420 or to apply contact pressure from the backing roller 40 against the first and second slopes 410 and 420. When the backing roller 40 is held at a predetermined distance from the slopes 410 and 420 of the follower roller 400, this distance is less than or equal to the thickness of the fiber texture 220.

Thus, when the backing roller is held away from the follower roller at a predetermined distance corresponding to the thickness of the fiber texture, the backing roller constitutes a physical obstacle against creases forming in the fiber texture as it passes over the follower roller. Specifically, under such circumstances, the backing roller leaves no space available for creases to develop in the fiber texture.

Likewise, when the backing roller is held away from the follower roller at a predetermined distance that is less than the thickness of the fiber texture, or when the backing roller applies contact pressure against the follower roller, the backing roller applies contact pressure against the fiber texture interposed between the follower roller and the backing roller, thereby preventing creases forming in the texture as it passes over the follower roller. This increases friction between the texture and the follower roller, thereby serves to avoid creases forming in the texture, in particular by sliding over the slope(s) of the follower roller. Friction can be increased in particular by providing the backing roller with a rough surface.

Figure 6:
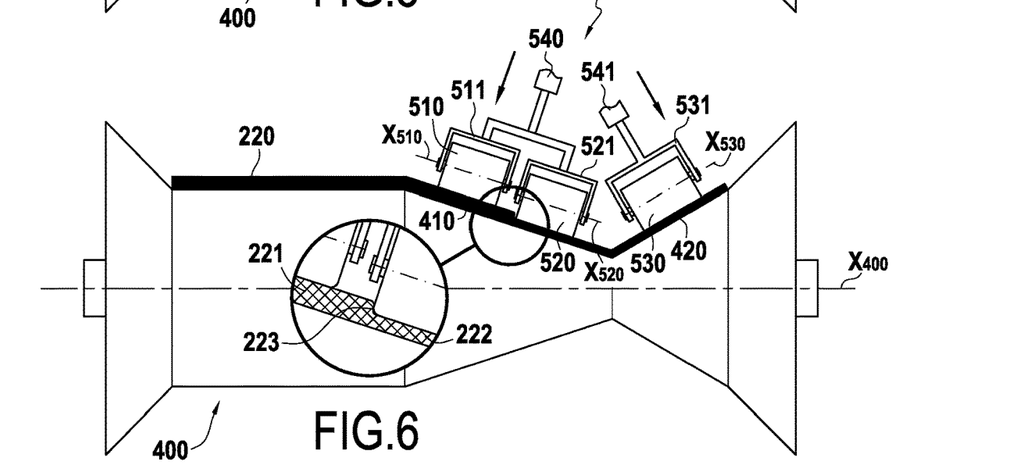
FIG. 6 is a diagrammatic section view of a follower roller of the FIG. 2 installation as associated with a backing roller comprising a plurality of rollers, two of which are held in parallel while being offset from each other.

FIG. 6 shows another embodiment of a backing roller in the invention that differs from the above-described backing roller 20 in that the backing roller comprises a plurality of rollers adapted to track a change in thickness in the fiber texture. In the presently-described example, the installation for shaping a fiber preform is used with a fiber texture 220 that presents a portion 221 of greater thickness leading to a change in thickness 223 in the profile of the texture relative to the other portion 222 of the texture. In FIG. 6, a backing roller 50 is constituted firstly by first and second rollers 510 and 520, and secondly by a third roller 530. Since the change in thickness 223 is present in the fiber texture in register with the first and second rollers 510 and 520 of the backing roller 50, the rollers 510 and 520 are held in a mutually offset position so as to adapt to the change in thickness of the fiber texture, the roller 510 being held facing the portion 221 of extra thickness, while the roller 520 is held facing the other portion 222 of the fiber texture 220. In other words, since the first roller 510 is placed facing the portion 221 of greater thickness of the fiber texture 220, it is held at a distance further away from the slope 410 than the second roller 520, which is placed facing the portion 222 that presents thickness smaller than the thickness of the portion 221 in the fiber texture.

In this embodiment, the installation for shaping a fiber preform has specific holder means for holding the first, second, and third rollers 510, 520, and 530 of the backing roller 50, which holder means are configured to hold the rollers 510 and 520 in alignment with the first slope 410, and the roller 530 in alignment with the second slope 420 of the follower roller 400. In this example, the holder means are constituted by a first actuator 540 connected both to a first support 511 connected to the shaft $X_{510}$ of the first roller 510 and to a second support 521 connected to the shaft $X_{520}$ of the second roller, and by a second actuator 541 connected to the shaft $X_{530}$ of the third roller 530. The first and second rollers 510 and 520 are connected to the actuator 540 in a mutually offset position, as mentioned above.

The holder means, specifically the actuators 540 and 541, are configured to hold the rollers 510, 520, and 530 at respective predetermined distances from the first and second slopes 410 and 420 or to apply contact pressure from the rollers 510, 520, and 530 against the first and second slopes 410 and 420. When the rollers 510, 520, and 530 of the backing roller 50 are held at predetermined distances from the slopes 410 and 420 of the follower roller 400, those distances are less than or equal to the thickness of the fiber texture 210.

Thus, when the rollers 510, 520, and 530 of the backing roller 50 are held away from the follower roller at predetermined distances corresponding to the thicknesses of the fiber texture, the rollers constitute physical obstacles to creases forming in the fiber texture as it passes over the follower roller, since they leave no space available for creases to develop in the fiber texture. Likewise, when the rollers of the backing roller are held away from the bottom follower roller at predetermined distances equal to the thickness of the fiber texture, or when the rollers of the backing roller apply contact pressure against the follower roller, the rollers of the backing roller apply contact pressure against the fiber texture so as prevent creases forming in the texture as it passes over the follower roller.

This increases friction between the texture and the follower roller, thus serving to avoid creases forming in the sector, in particular as a result of sliding on the slope(s) of the follower roller. Friction can also be increased by providing the rollers of the backing roller with surfaces that are rough.

The invention claimed is:

1. An installation forming an axisymmetric fiber preform presenting a profile that varies in radial section, the installation comprising a storage mandrel for storing a fiber texture in the form of a wound strip, one or more follower rollers, and an axisymmetric mold onto which the fiber texture is to be shaped by winding, at least one follower roller presenting, in section on a plane defined by an axial direction and by a radial direction, a profile including at least a first slope forming an angle with the axis of the follower roller, and a portion adjacent to the first slope, said portion being parallel to the shaft of the follower roller or corresponding to a second slope forming a second angle with the axis of the follower roller that is different from the first angle; and the installation further comprising a first backing roller of shape complementary to the first slope and the adjacent portion of said first slope, the installation including a holder for said first backing roller configured to hold said first backing roller at a predetermined distance from the first slope and the portion adjacent to said first slope or configured to apply contact pressure from the first backing roller against the first slope and the portion adjacent to said first slope;

wherein the first backing roller extends along a longitudinal axis and presents on its surface at least one portion in relief corresponding to a change in section of the first backing roller, wherein the change in section corresponds to an increase or decrease in the section of said first backing roller in a direction perpendicular to the longitudinal axis of said first backing roller.

2. The installation according to claim 1, wherein said first backing roller has a rough surface that provides friction with the fiber texture so as to avoid a formation of creases in the fiber texture.

3. A method of shaping an axisymmetric fiber preform presenting a varying profile in radial section from a fiber structure obtained by three-dimensional or multilayer weaving between a plurality of layers of warp yarns interlinked by weft yarns, the fiber texture being shaped by being wound under tension onto an axisymmetric mold, the fiber texture being unwound from a storage mandrel, the fiber texture traveling over one or more follower rollers placed between the storage mandrel and the axisymmetric mold, at least one follower roller presenting, in section in a plane defined by an axial direction and a radial direction, a profile including at least a first slope forming an angle with the axis of the follower roller and a portion adjacent to the first slope, said portion being parallel to the axis of the follower roller or corresponding to a second slope forming a second angle with the axis of the follower roller that is different from the first angle; and the method further comprising using a first backing roller presenting a shape complementary to the first slope and the portion adjacent to said first slope, the first backing roller being held at a predetermined distance from the first slope and from the portion adjacent to said first slope, the predetermined distance being less than or equal to the thickness of the fiber texture, or the first backing roller applying contact pressure against the fiber texture on the first slope and the portion adjacent to said first slope;

wherein the fiber texture presents at least one change in thickness in its width direction and wherein the first backing roller extends along a longitudinal axis and presents on its surface at least one portion in relief for co-operating with said at least one change in thickness, wherein the change in section corresponds to an increase or decrease in the section of said first backing roller in a direction perpendicular to the longitudinal axis of said first backing roller.

4. The method according to claim 3, wherein the first backing roller has a rough surface that provides friction with the fiber texture so as to avoid a formation of creases in the fiber texture.

* * * * *

UNITED STATES PATENT AND TRADEMARK OFFICE
CERTIFICATE OF CORRECTION

PATENT NO. : 11,364,659 B2
APPLICATION NO. : 16/331316
DATED : June 21, 2022
INVENTOR(S) : Hubert Jean Marie Fabre et al.

It is certified that error appears in the above-identified patent and that said Letters Patent is hereby corrected as shown below:

On the Title Page

Page 2, In Item (56) References Cited, FOREIGN PATENT DOCUMENTS, should read:
SU     1796475 A1     02/1993

Signed and Sealed this
Nineteenth Day of July, 2022

Katherine Kelly Vidal
*Director of the United States Patent and Trademark Office*